(12) United States Patent
Xie

(10) Patent No.: US 12,313,899 B2
(45) Date of Patent: May 27, 2025

(54) LENS DRIVE DEVICE

(71) Applicant: Changzhou AAC Raytech Optronics Co., Ltd., Changzhou (CN)

(72) Inventor: Rongfu Xie, Shenzhen (CN)

(73) Assignee: Changzhou AAC Raytech Optronics Co., Ltd., Changzhou (CN)

( * ) Notice: Subject to any disclaimer, the term of this patent is extended or adjusted under 35 U.S.C. 154(b) by 721 days.

(21) Appl. No.: 17/566,730

(22) Filed: Dec. 31, 2021

(65) Prior Publication Data
US 2023/0168464 A1    Jun. 1, 2023

(30) Foreign Application Priority Data

Dec. 1, 2021    (CN) .......................... 202111455788.1

(51) Int. Cl.
| | |
|---|---|
| *G02B 7/02* | (2021.01) |
| *G02B 7/04* | (2021.01) |
| *G02B 27/64* | (2006.01) |
| *H04N 23/51* | (2023.01) |
| *H04N 23/55* | (2023.01) |

(52) U.S. Cl.
CPC .............. *G02B 7/026* (2013.01); *G02B 7/04* (2013.01); *G02B 27/646* (2013.01); *H04N 23/51* (2023.01); *H04N 23/55* (2023.01)

(58) Field of Classification Search
CPC ........ G02B 7/026; G02B 7/04; G02B 27/646; G02B 7/08; G02B 7/09; H04N 23/51; H04N 23/55; H04N 23/57; G03B 5/00; G03B 13/36; G03B 30/00
See application file for complete search history.

(56) References Cited

U.S. PATENT DOCUMENTS

2012/0314308 A1*  12/2012  Ikushima ............. G02B 27/646
                                                      359/814

FOREIGN PATENT DOCUMENTS

| | | | |
|---|---|---|---|
| CN | 104808416 A * | 7/2015 | ........... G02B 13/003 |
| JP | 2019502940 A * | 1/2019 | |

* cited by examiner

*Primary Examiner* — Joseph P Martinez
*Assistant Examiner* — Ray Alexander Dean
(74) *Attorney, Agent, or Firm* — Wiersch Law Group

(57) ABSTRACT

The invention provides a lens drive device including a base, a housing, a lens barrel for mounting a lens group, a spring support assembly, a support frame; an upper elastic plate, a first driving assembly, second driving assembly, wherein, the spring support assembly is integrally injection molded from colloidal elastic materials, and the lens barrel is set in the spring support assembly. The lens drive device further includes a first fixed arm a supporting part spaced from the first fixed arm and sleeved at the end of the barrel near the base, a first elastic arm, a second fixed arm, and multiple connecting columns spaced from the barrel and arranged around the barrel. Compared with related technologies, the lens drive device of the present invention has simple assembly and low production cost.

9 Claims, 5 Drawing Sheets

LENS DRIVE DEVICE

FIELD OF THE PRESENT DISCLOSURE

The present invention relates to a drive device, in particular to a lens drive device.

DESCRIPTION OF RELATED ART

With the development of camera technology, lens drive devices have been widely used in various camera devices. The combination of lens drive device and various portable electronic devices such as mobile phones, cameras, computers, etc., is even more favored by consumers.

The drive mechanism of the lens drive device in the related art is usually composed of a coil and a magnetic steel assembly to form a drive structure. The support frame is supported on the bottom of the seat. The driving coil and the driving magnet are respectively fixed on the lens barrel and the support frame, and the lens barrel is supported on the support frame through the upper elastic plate. The OIS coil (anti-shake coil) is fixed to the housing and located above the support frame. The anti-shake magnet is fixed on the side of the support frame away from the base. A plurality of OIS suspension wires are respectively arranged around the support frame at intervals. One end of each anti-shake suspension wire is fixed to the base, and the other end is fixed to the upper elastic plate to form an electrical connection. The anti-shake suspension wire provides restoring force, and realizes the anti-shake (OIS-X, OIS-Y) function in the horizontal X and Y axis directions. The drive coil drives the magnet to drive the barrel to move along the optical axis. Through the upper elastic plate and the lower elastic plate to provide the restoring force, the drive coil drives the lens barrel to move in the positive and negative directions along the optical axis to realize the automatic focus (AF) function.

However, in the lens drive device of the related art, the upper elastic plate, the lower elastic plate and the suspension wire are set on the support frame. The anti-shake coil and anti-shake magnet are arranged on the bracket frame and the housing along the optical axis. Making the lens drive device more components increases the assembly complexity. Increase production costs.

Therefore, it is necessary to provide a new lens drive device to solve the above problems.

SUMMARY OF THE PRESENT INVENTION

One of the main objects of the present invention is to provide a lens drive device that is small in size, simple to assemble, and reduces production costs.

To achieve the above-mentioned objects, the present invention provides a lens drive device including a base, a housing, a lens barrel for mounting a lens group, a spring support assembly fixed to the base and sleeved on the lens barrel, a support frame; an upper elastic plate, a first driving assembly, second driving assembly, wherein, the spring support assembly is integrally injection molded from colloidal elastic materials, and the lens barrel is set in the spring support assembly to reduce the overall assembly difficulty. The lens drive device further includes a first fixed arm fixed to the base along the optical axis, a supporting part spaced from the first fixed arm and sleeved at the end of the barrel near the base, a first elastic arm connecting the first fixed arm and the supporting part, and a second fixed arm that is spaced apart from the supporting part along the optical axis and fixed to the barrel, and multiple connecting columns that connect the supporting part and the second fixed arm. Multiple connecting columns are spaced from the barrel and arranged around the barrel. Compared with related technologies, the lens drive device of the present invention has simple assembly and low production cost.

In addition, the colloidal elastic material is any one of a silicone material, a rubber material, and a silicone grease material.

In addition, the first driving assembly includes: a first driving magnet fixed to one side of the lens barrel along a first direction perpendicular to the optical axis direction; a second driving magnet fixed to one side of the lens barrel along a second direction perpendicular to the optical axis direction; a first anti-shake coil opposite to the first driving magnet spaced along the first direction; and a second anti-shake coil spaced opposite the second driving magnet along the second direction; wherein the first direction and the second direction are perpendicular to each other; the first anti-shake coil interacts with the first driving magnet and drives the barrel to move in the first direction; the second anti-shake coil interacts with the second driving magnet and drives the lens barrel to move in the second direction.

In addition, the lens barrel includes a barrel wall; a side of the barrel wall close to the first driving magnet is recessed along the first direction to form a first groove; a side of the barrel wall close to the second driving magnet is recessed along the second direction to form a second groove; the first driving magnet and the second driving magnet are contained in the first groove and the second groove, respectively.

In addition, the second driving assembly includes a third driving magnet fixed to the support frame and a third driving coil spaced apart from and opposite to the third driving magnet; the third driving coil interacts with the third driving magnet and drives the support frame and the lens barrel to move along the optical axis.

In addition, the support frame includes a frame ontology sleeved on the spring support assembly, and a bracket formed by the frame ontology extending away from the base along the optical axis direction; the bracket is formed with an avoiding position; the third driving magnet is contained in the avoiding position.

In addition, the bracket includes a plurality of brackets arranged at intervals for forming the avoiding position.

In addition, the lens drive device includes an upper elastic plate bracket fixed to the housing; the upper elastic plate includes a third fixed arm fixed to the upper elastic plate bracket along the optical axis, a fourth fixed arm spaced from the third fixed arm and fixed to the bracket along the optical axis direction, and a second elastic arm connected to the third fixed arm and the fourth fixed arm.

In addition, the lens drive device further includes a hall sensor having a first hall sensor and a second hall sensor arranged in the first driving assembly, and a third hall sensor arranged in the second driving assembly; the first hall sensor and the second hall sensor respectively detect the movement of the barrel in different directions perpendicular to the direction of the optical axis.

In addition, the lens barrel protrudes away from the base along the optical axis for forming a position limiting block; the second fixed arm is fixed on the surface of the barrel far away from the base and is recessed to form a limiting groove that avoids the position limiting block; the position limiting block is matched with the limiting groove and protrudes from the surface of the second fixed arm away from the base.

BRIEF DESCRIPTION OF THE DRAWINGS

Many aspects of the exemplary embodiments can be better understood with reference to the following drawings.

The components in the drawing are not necessarily drawn to scale, the emphasis instead being placed upon clearly illustrating the principles of the present disclosure.

DETAILED DESCRIPTION OF THE EXEMPLARY EMBODIMENT

The present disclosure will hereinafter be described in detail with reference to an exemplary embodiment. To make the technical problems to be solved, technical solutions and beneficial effects of the present disclosure more apparent, the present disclosure is described in further detail together with the figures and the embodiment. It should be understood the specific embodiment described hereby is only to explain the disclosure, not intended to limit the disclosure.

Figure 1:
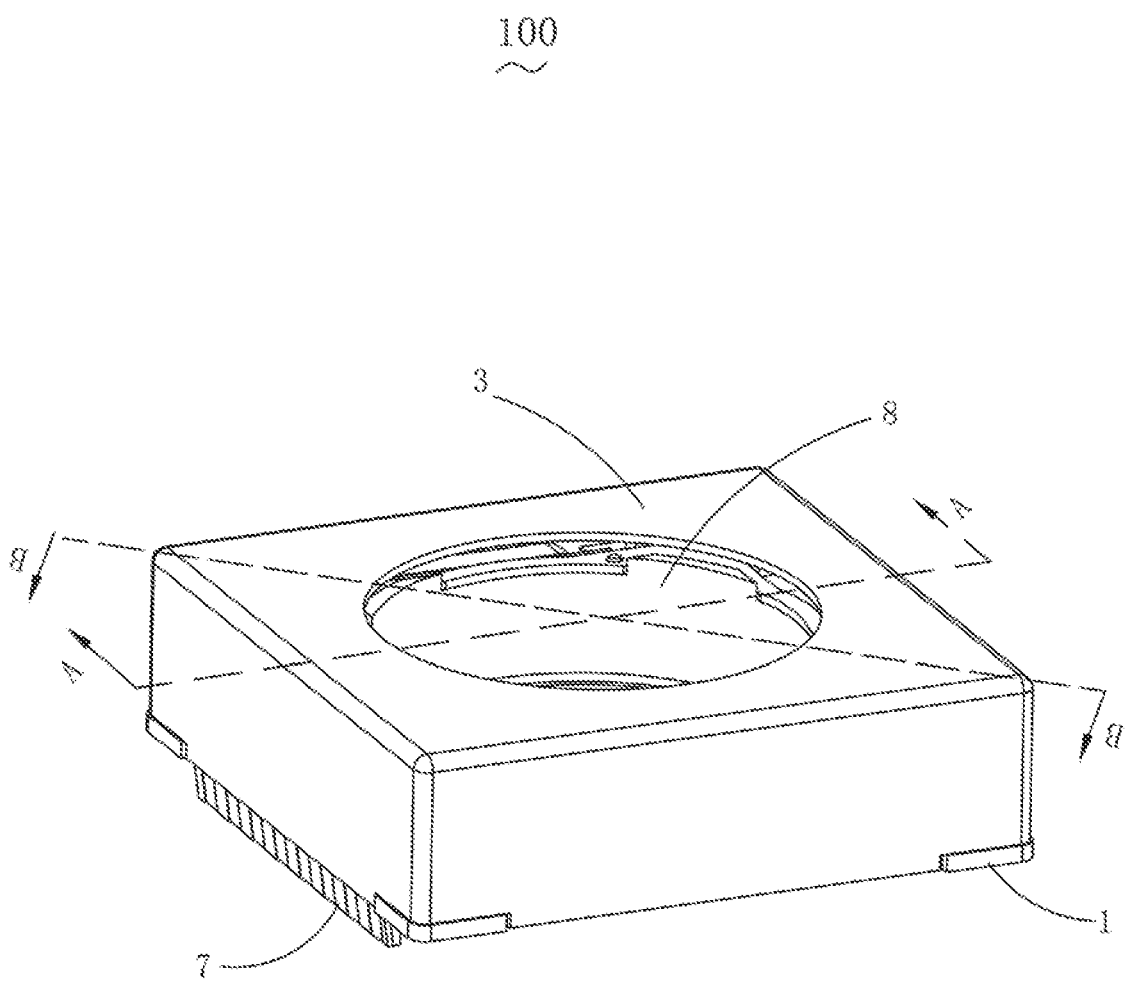
FIG. 1 is an isometric view of a lens drive device in accordance with an exemplary embodiment of the present invention.
Figure 2:
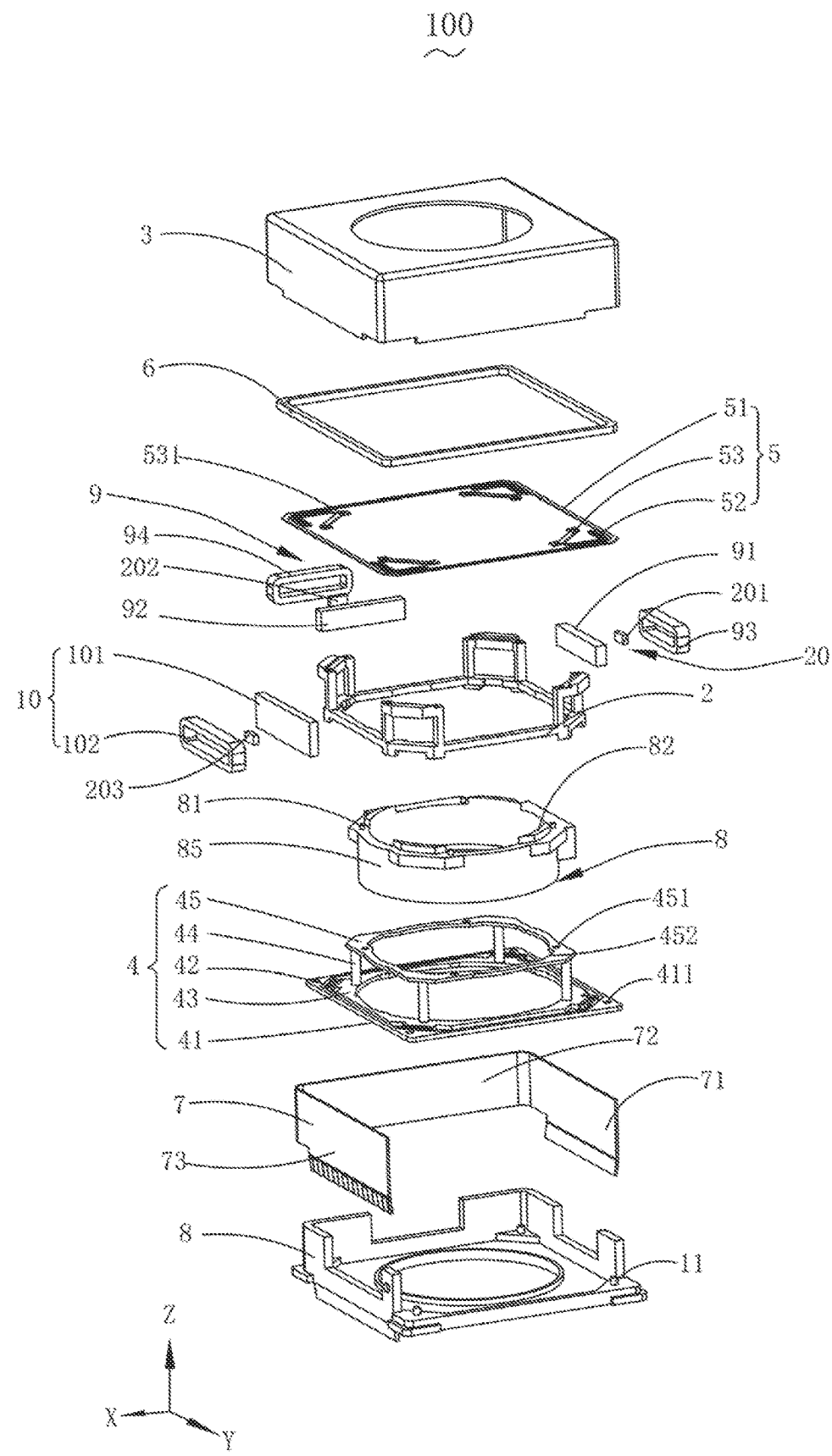
FIG. 2 is an exploded view of the lens drive device in FIG. 1.
Figure 3:
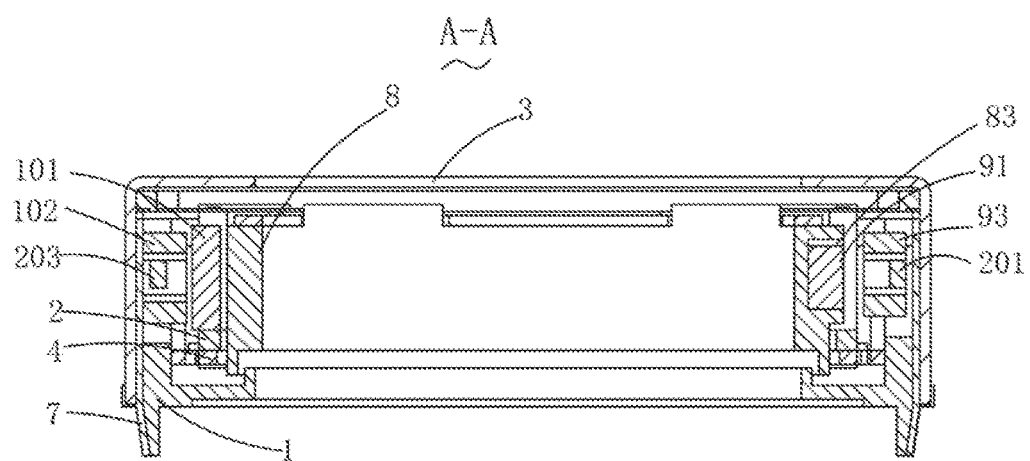
FIG. 3 is a cross-sectional view of the lens drive device taken along line A-A in FIG. 1.
Figure 4:
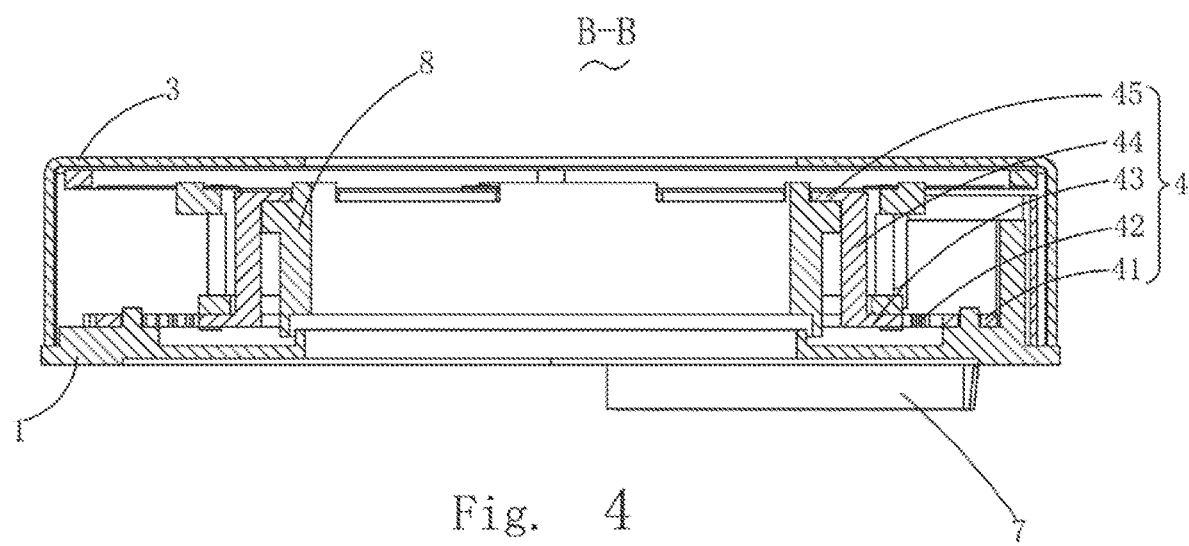
FIG. 4 is a cross-sectional view of the lens drive device taken along line B-B in FIG. 1.
Figure 5:
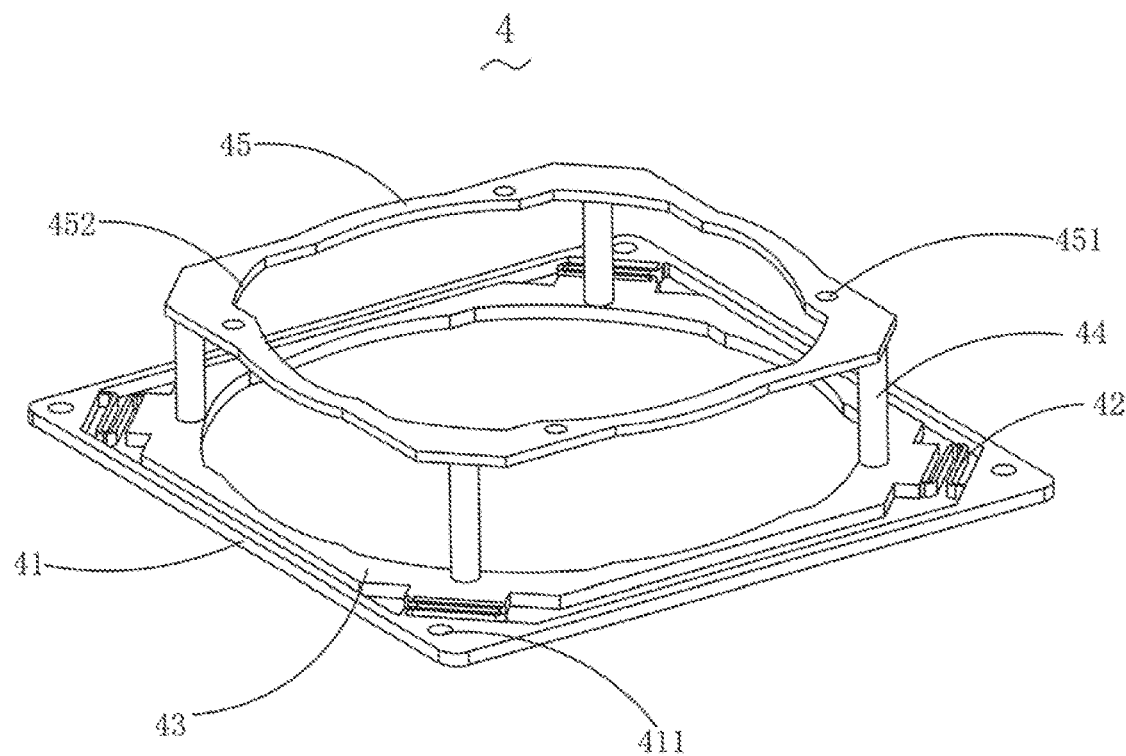
FIG. 5 is an isometric view of a spring support assembly of the present invention.
Figure 6:
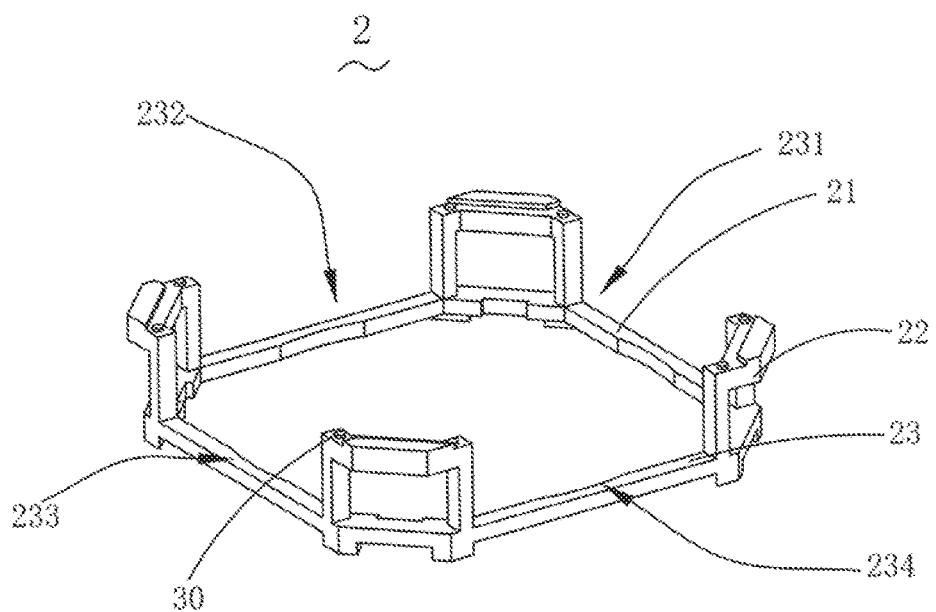
FIG. 6 is an isometric view of a support frame of the present invention.
Figure 7:
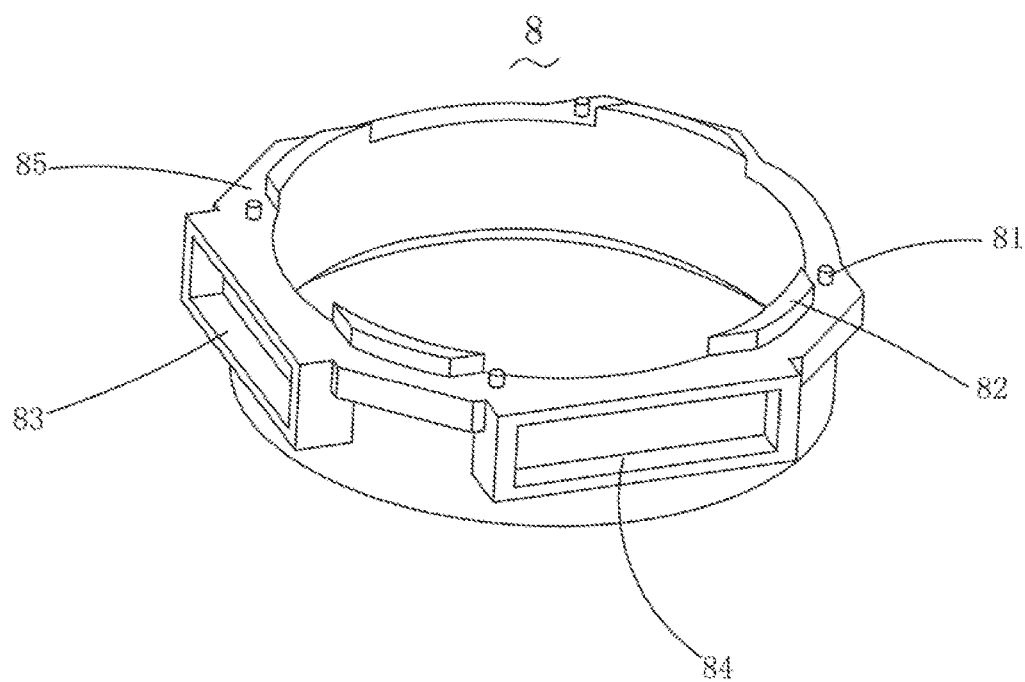
FIG. 7 is an isometric view of a lens barrel of the present invention.
Figure 8:
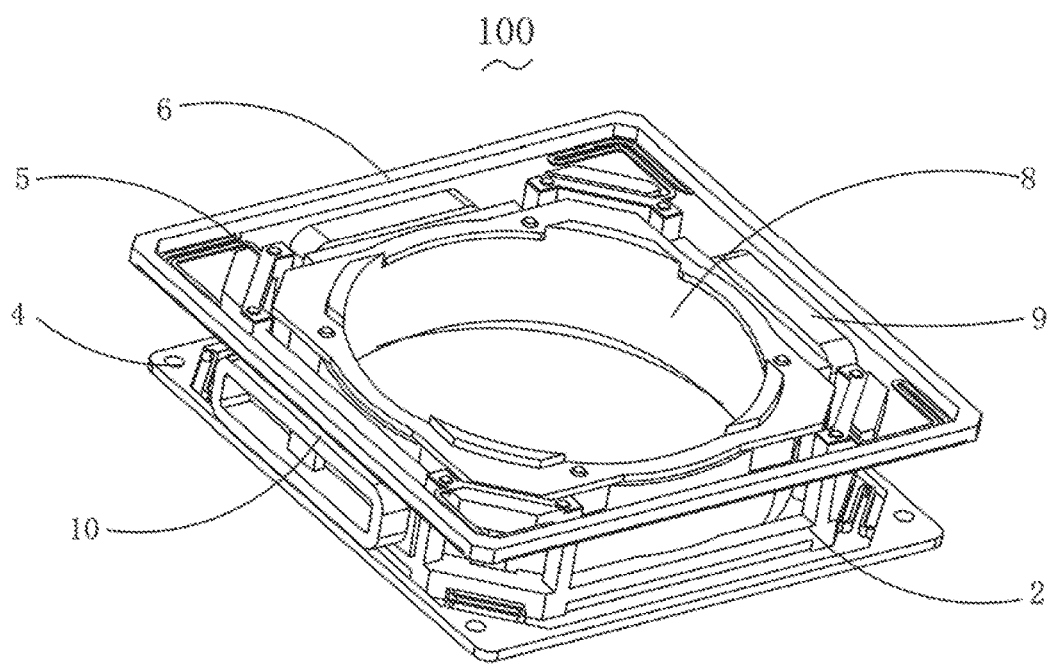
FIG. 8 is an isometric view of a part of the drive device of the present invention.

Please refer to FIGS. 1-8. A lens drive device 100 is provided, which includes a base 1, a housing 3 which covers the base 1 and encloses with the base 1 to form a accommodation space; a lens barrel 8 for installing a lens group accommodated in the accommodation space; a spring support assembly 4 fixed to the base 1 and sleeved on the lens barrel 8; a support frame 2 set in the spring support assembly 4; an upper elastic plate 5 fixed on the side of said support frame 2 away from said base 1 along the optical axis direction of said barrel 8, the upper elastic plate 5 and the spring support assembly 4 jointly suspend the support frame 2 and the lens barrel 8 in the receiving space; a first driving assembly 9 that drives the lens barrel 8 to move in a direction perpendicular to the optical axis, and a second driving assembly 10 that drives the lens barrel 8 to move along the optical axis direction.

The base 1 is used to support frame 2. Preferably, the base 1 can be made of LCP material, which has good supporting effect and good sealing and dustproof performance. In this embodiment, the support frame 2 is made of LCP material, which has good supporting effect, good sealing and dustproof performance, and can be used as an OIS motion support base.

The housing 3 is covered on the base 1 and the support frame 2 is located in the housing 3. The housing 3 can prevent dust and protect the components installed in it. The housing 3 can be made of metal materials, for example: Stainless steel, high strength, long service life.

The lens barrel 8 is received in the accommodating space and is used to install the lens group. In this embodiment, the barrel 8 is made of LCP material, which has good supporting effect and good sealing and dustproof performance.

One end of the upper elastic plate 5 is fixed to the side of the support frame 2 away from the base 1 along the optical axis direction of the barrel 8. The upper elastic plate 5 can be made of metal material, with good elasticity and good supporting strength.

The spring support assembly 4 is integrally injection-molded by a colloidal elastic material, and the spring support assembly 4 includes a first fixed arm 41 fixed on the base 1 along the optical axis direction, a supporting part 43 spaced from the first fixed arm 41 and is sleeved on the end of the lens barrel 8 close to the base 1, a first elastic arm 42 connecting the first fixed arm 41 with the supporting part 43, a second fixed arm 45 spaced apart from the supporting part 43 along the optical axis direction and fixed to the lens barrel, and multiple connecting columns 44 connecting the supporting part 43 and the second fixed arm 45.

The multiple connecting columns are spaced apart from the barrel 8 and arranged around the barrel 8. The first fixed arm 41, first elastic arm 42 and supporting part 43 are used to provide the AF spring force, and together with the upper spring sheet, the fixed spring force for the AF movement is realized. And through connecting column instead of hanging wire, provide OIS translation movement. While the material cost is lower, the spring support assembly 4 can integrate the AF and OIS supports to reduce assembly difficulty. And because there is no complicated assembly of the suspension wire, it is easy to realize automation, and the assembly yield is high.

More preferably, the spring support assembly 4 is integrally injection-molded from a colloidal elastic material with high strength and cost saving. Preferably, the colloidal elastic material is any one of a silicone material, a rubber material, and a silicone grease material. The above-mentioned materials are non-anisotropic, have long fatigue life and large damping coefficient, so there is no need for further damping glue.

More preferably, the first fixed arm 41, the supporting part 43 and the second fixed arm 45 are all arranged in a square closed ring structure. The connecting column 44 includes four and are set at equal intervals. The two ends of the four connecting columns 44 are respectively fixed to the four corners of the supporting part 43 and the four corners of the second fixed arm 45. The force is even, and the anti-shake effect is better.

In this embodiment, the first driving assembly 9 includes a first driving magnet 91 fixed on one side of the lens barrel 8 along a first direction x perpendicular to the optical axis direction Z, and a first driving magnet 91 along a first direction x perpendicular to the optical axis direction Z. second direction y is fixed on the second driving magnet 92 on the side of the barrel 8, the first anti-shake coil 93 opposite to the first driving magnet 91 along the first direction x, and the second driving magnet 92 The second direction y is separated from the second anti-shake coil 94 relative to each other. The first direction x and the second direction y are perpendicular to each other. The first anti-shake coil 93 interacts with the first driving magnet 91 and drives the lens barrel 8 to move along the first direction x. The second anti-shake coil 94 interacts with the second driving magnet 92 and drives the lens barrel 8 to move along the second direction y.

In this embodiment, the lens barrel 8 includes a barrel wall 85. The side of the barrel wall 85 close to the first driving magnet 91 is recessed along the first direction x to form a first groove 83. The side of the barrel wall 85 close to the second driving magnet 92 is recessed along the second direction y to form a second groove 84. The first driving magnet 91 and the second driving magnet 92 are housed in the first groove 83 and the second groove 84, respectively.

It is convenient for the first driving magnet 91 and the second driving magnet 92 to be housed and fixed on the barrel 8, saving installation space. At the same time, it is convenient for the first anti-shake coil 93 and the second anti-shake coil 94 to respectively correspond to the first driving magnet 91 and the second driving magnet 92 to drive each other. In order to make the lens barrel 8 move along the first direction x and second direction y respectively, so as to achieve an anti-shake effect.

In this embodiment, the second driving assembly 10 includes a third driving magnet 101 fixed to the support frame 2 and a third driving coil 102 spaced apart from and opposite to the third driving magnet 101. The third driving coil 102 interacts with the third driving magnet 101 and drives the support frame 2 and the lens barrel 8 to move along the optical axis direction Z. In this embodiment, the third driving magnet 101 and the first driving magnet 91 are arranged opposite to each other along the first direction x.

The first anti-shake coil 93 interacts with the first driving magnet 91 and drives the barrel 8 to move along the first direction x. The spring support assembly 4 provides a restoring force to achieve the horizontal X-direction anti-shake (OIS-X) function. The second anti-shake coil 94 interacts with the second driving magnet 92 and drives the barrel 8 to move in the second direction y. Provide restoring force through spring support assembly 4 to achieve horizontal Y direction anti-shake (OIS-Y) function. The third driving coil 102 interacts with the third driving magnet 101 and drives the support frame 2 to move along the optical axis direction Z, which in turn drives the lens barrel 8 to move along the optical axis direction Z to realize the auto focus (AF) function.

In this embodiment, the first anti-shake coil 93, the second anti-shake coil 94 and the third driving coil 102 are all formed by pre-winding. And the plane on which the winding direction of the anti-shake coil is located is parallel to the direction of the optical axis. Compared with the anti-shake driving method of the multilayer circuit board structure in the prior art, the anti-shake driving method formed by this structure can greatly reduce the cost.

In this embodiment, the support frame 2 includes a frame ontology 21 sleeved on the spring support assembly 4 and a bracket 22 formed by the frame ontology 21 extending away from the base 1 along the optical axis direction. The bracket 22 is formed with an avoiding position 23. The third driving magnet 101 is housed in the avoiding position 23.

In this embodiment, the bracket 22 includes a plurality of brackets 22 and they are spaced apart from each other to form the avoiding position 23.

Specifically, the aforementioned avoiding position 23 includes a first avoiding position 231, a second avoiding position 232, a third avoiding position 233, and a fourth avoiding position 234 formed by the four brackets 22 spaced apart from each other. The first groove 83 and the first avoiding position 231 are arranged correspondingly. The second groove 84 is correspondingly disposed at the second avoiding position 232. The third driving magnet 101 is correspondingly set in the third avoiding position 233. The upper elastic plate 5 is fixedly connected to the upper part of the four brackets 22. The other end of upper elastic plate 5 is fixed in housing 3. Through the above structure, it is convenient to install and set the first driving magnet 91, second driving magnet 92 and third driving magnet 101, which effectively saves installation space.

In this embodiment, the lens drive device 100 includes an upper elastic plate bracket 6 fixed to the housing 3. The upper elastic plate 5 includes a third fixed arm 51 fixed to the upper elastic plate bracket 6 along the optical axis direction, a fourth fixed arm 53 spaced from the third fixed arm 51 and fixed to the bracket 22 along the optical axis direction, a the second elastic arm 52 connected to the third fixed arm 51 and the fourth fixed arm 53. The third fixed arm 51 is fixed on the side of the upper elastic plate bracket 6 close to the base 1, and the two ends of the fourth fixed arm 53 are provided with four sets of third position limiting holes 531. Four sets of third position limiting columns 30 protrude from the support frame 2 along the optical axis direction. The four sets of third position limiting holes 531 are arranged on the four sets of third position limiting columns 30 to realize the fixation of the upper elastic plate 5 and the support frame 2.

Fix both ends of upper elastic plate 5 to upper elastic plate bracket 6 and support frame 2 respectively. Improve the fixing effect of upper elastic plate 5, and facilitate the AF support of support frame 2 through upper elastic plate 5. The upper elastic plate bracket 6 can be made of LCP-VL96AC material with good supporting effect.

In this embodiment, the lens drive device 100 further includes a hall sensor 20. The hall sensor 20 includes a first hall sensor 201 and a second hall sensor 202 arranged in the first driving assembly 9 and a third hall sensor 203 arranged in the second driving assembly 10. The first hall sensor 201 and the second hall sensor 202 respectively detect the movement of the barrel in different directions perpendicular to the direction of the optical axis.

Wherein, the first hall sensor 201 is arranged in the first anti-shake coil 93. The second hall sensor 202 is arranged in the second anti-shake coil 94. The third hall sensor 203 is installed in the third driving coil 102.

In this embodiment, the lens drive device 100 further includes a flexible circuit board 7. The flexible circuit board 7 includes a first circuit board 71, a second circuit board 72 bent and extended by the first circuit board 71, and a third circuit board 73 bent and extended by the second circuit board 72. The first circuit board 71 and the third circuit board 73 are arranged opposite to each other. The first hall sensor 201, the second hall sensor 202, and the third hall sensor 203 are fixed on the inner side of the first circuit board 71, the second circuit board 72, and the third circuit board 73, respectively. The first hall sensor 201 and the second hall sensor 202 are used to detect the displacement of the lens barrel 8 in the first direction x and the second direction y respectively. The third hall sensor 203 is used to detect the displacement of the lens barrel 8 in the optical axis direction Z.

In this embodiment, four first position limiting columns 11 are provided on the base 1 at intervals. The lens barrel 8 is provided with four second position limiting columns 81 at intervals. The first fixed arm 41 is provided with four first position limiting holes 411 throughout. Four second position limiting holes 451 are provided through the second fixed arm 45. The four first position limiting holes 411 are respectively arranged on the four first position limiting columns 11 in cooperation. The four second position limiting holes 451 are respectively arranged on the four second position limiting columns 81 in cooperation. It is convenient to connect base 1 and lens barrel 8 to the first fixed arm 41 and second fixed arm 45 of spring support assembly 4 respectively.

In this embodiment, the lens barrel 8 protrudes away from the base 1 along the optical axis direction to form a position limiting block 82. The second fixed arm 45 is fixed on the surface of the barrel 8 away from the base 1 and is recessed to form a limiting groove 452 that avoids the position limiting block 82. The position limiting block 82 cooperates with the limiting groove 452 and protrudes from the surface of the second fixed arm 45 away from the base 1 side. The setting of position limiting block 82 can effectively avoid the excessive stroke of the lens barrel 8 during AF movement, and the safety is high.

In this embodiment, the specific assembly principle of the present invention is as follows:

The first driving magnet 91 and the second driving magnet 92 are installed in the first groove 83 and the second groove 84 of the lens barrel 8, respectively. Install and fix the lens with the elastic support assembly. Install the third driving magnet 101 in the third avoiding position 233 of support frame 2. Set the support frame 2 on the elastic support assembly to form an OIS bracket assembly. Install first anti-shake coil 93, second anti-shake coil 94, third driving coil 102, first hall sensor 201, second hall sensor 202 and third hall sensor 203 on the inner wall of flexible circuit board 7. Install the composition as a whole on base 1. Install the OISbracket component on base 1. Fix the upper elastic plate bracket 6 in housing 3. Fix upper elastic plate 5 and upper elastic plate bracket 6. Set the assembled housing 3 sets on base 1 to realize the overall assembly. The invention has simple structure, convenient assembly, cost saving, and easy realization of automatic production.

Compared with related technologies, in the lens drive device of the present invention, the spring support assembly is integrally injection molded from a colloidal elastic material, and the lens barrel is set in the spring support assembly, which reduces the overall assembly difficulty. The first driving assembly drives the barrel to move along the direction perpendicular to the optical axis, and the second driving assembly drives the barrel to move along the optical axis.

Fix spring support assembly first fixed arm and base. The second fixed arm is connected to the upper part of the lens barrel. Provide OIS support through multiple connecting columns to realize OIS translational movement. Use the first fixed arm, first elastic arm and supporting part to provide the AF spring force, and work with the upper spring sheet to realize the AF motion fixed spring force. Spring support assembly can integrate AF and OIS support to reduce assembly difficulty. And because there is no complicated assembly of the suspension wire, it is easy to realize automation, the assembly yield is high, and the production cost is reduced to a large extent.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A lens drive device, including:
   a base,
   a housing enclosing the base for forming an accommodation space,
   a lens barrel for installing a lens group accommodated in the accommodation space,
   a spring support assembly fixed to the base and surrounding the barrel;
   a support frame sleeved in the spring support assembly,
   an upper elastic plate fixed to the support frame on a side away from the base along an optical axis of the barre for jointly suspending the support frame and the lens barrel in the receiving space together with the spring support assembly,
   a first driving assembly for driving the lens barrel to move in a direction perpendicular to the optical axis,
   a second driving assembly for driving the lens barrel to move along the optical axis, wherein, the spring support assembly is integrally injection-molded by a colloidal elastic material;
   a first fixed arm fixed to the base along the optical axis direction;
   a supporting part spaced from the first fixed arm and nested on an end of the lens barrel close to the base;
   a first elastic arm connecting the first fixed arm and the supporting part;
   a second fixed arm arranged at intervals from the supporting part along the optical axis direction and fixed to the barrel; and
   multiple connecting columns for connecting the supporting part and the second fixed arm; the multiple connecting columns being spaced from the barrel and arranged around the barrel;
   wherein the second driving assembly includes a third driving magnet fixed to the support frame and a third driving coil spaced apart from and opposite to the third driving magnet; the third driving coil interacts with the third driving magnet and drives the support frame and the lens barrel to move along the optical axis.

2. The lens drive device as described in claim 1, wherein the colloidal elastic material is any one of a silicone material, a rubber material, and a silicone grease material.

3. The lens drive device as described in claim 1, wherein the first driving assembly includes: a first driving magnet fixed to one side of the lens barrel along a first direction perpendicular to the optical axis direction; a second driving magnet fixed to one side of the lens barrel along a second direction perpendicular to the optical axis direction; a first anti-shake coil opposite to the first driving magnet spaced along the first direction; and a second anti-shake coil spaced opposite the second driving magnet along the second direction; wherein the first direction and the second direction are perpendicular to each other; the first anti-shake coil interacts with the first driving magnet and drives the barrel to move in the first direction; the second anti-shake coil interacts with the second driving magnet and drives the lens barrel to move in the second direction.

4. The lens drive device as described in claim 3, wherein the lens barrel includes a barrel wall; a side of the barrel wall close to the first driving magnet is recessed along the first direction to form a first groove; a side of the barrel wall close to the second driving magnet is recessed along the second direction to form a second groove; the first driving magnet and the second driving magnet are contained in the first groove and the second groove, respectively.

5. The lens drive device as described in claim 1, wherein the support frame includes a frame ontology sleeved on the spring support assembly, and a bracket formed by the frame ontology extending away from the base along the optical axis direction; the bracket is formed with an avoiding position; the third driving magnet is contained in the avoiding position.

6. The lens drive device as described in claim 5, wherein the bracket includes a plurality of brackets arranged at intervals for forming the avoiding position.

7. The lens drive device as described in claim 5, wherein the lens drive device includes an upper elastic plate bracket fixed to the housing; the upper elastic plate includes a third fixed arm fixed to the upper elastic plate bracket along the optical axis, a fourth fixed arm spaced from the third fixed arm and fixed to the bracket along the optical axis direction, and a second elastic arm connected to the third fixed arm and the fourth fixed arm.

8. The lens drive device as described in claim 1 further including a hall sensor having a first hall sensor and a second hall sensor arranged in the first driving assembly, and a third hall sensor arranged in the second driving assembly; the first hall sensor and the second hall sensor respectively detect the movement of the barrel in different directions perpendicular to the direction of the optical axis.

9. The lens drive device as described in claim 1, wherein the lens barrel protrudes away from the base along the optical axis for forming a position limiting block; the second fixed arm is fixed on the surface of the barrel far away from the base and is recessed to form a limiting groove that avoids the position limiting block; the position limiting block is matched with the limiting groove and protrudes from the surface of the second fixed arm away from the base.

* * * * *